US011842071B2

(12) United States Patent
Murata et al.

(10) Patent No.: US 11,842,071 B2
(45) Date of Patent: Dec. 12, 2023

(54) DATA TRANSFER DEVICE AND DATA TRANSFER METHOD

(71) Applicant: OLYMPUS CORPORATION, Hachioji (JP)

(72) Inventors: Yutaka Murata, Hino (JP); Ryusuke Tsuchida, Akiruno (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 17/735,769

(22) Filed: May 3, 2022

(65) Prior Publication Data
US 2022/0261179 A1 Aug. 18, 2022

Related U.S. Application Data

(63) Continuation of application No. PCT/JP2019/047625, filed on Dec. 5, 2019.

(51) Int. Cl.
*G06F 3/06* (2006.01)

(52) U.S. Cl.
CPC .......... *G06F 3/0656* (2013.01); *G06F 3/0613* (2013.01); *G06F 3/0635* (2013.01); *G06F 3/0659* (2013.01); *G06F 3/0673* (2013.01)

(58) Field of Classification Search
CPC .... G06F 3/0656; G06F 3/0613; G06F 3/0635; G06F 3/0659; G06F 3/0673; G06F 13/1663
See application file for complete search history.

(56) References Cited

U.S. PATENT DOCUMENTS

| 2010/0186080 A1* | 7/2010 | Thanner | G06F 21/606 |
| | | | 726/16 |
| 2010/0223409 A1* | 9/2010 | Minami | G06F 13/362 |
| | | | 710/110 |
| 2011/0219156 A1* | 9/2011 | Minami | G06F 13/362 |
| | | | 710/110 |

FOREIGN PATENT DOCUMENTS

| EP | 3923152 A1 * | 12/2021 | ......... G06F 13/362 |
| JP | 2003-337741 A | 11/2003 | |
| JP | 2004-252523 A | 9/2004 | |
| JP | 2007-108996 A | 4/2007 | |
| JP | 2007-280253 A | 10/2007 | |

(Continued)

OTHER PUBLICATIONS

International Search Report dated Feb. 18, 2020, issued in counterpart International Application No. PCT/JP2019/047625, with English Translation. (5 pages).

(Continued)

*Primary Examiner* — Francisco A Grullon
(74) *Attorney, Agent, or Firm* — WHDA, LLP

(57) ABSTRACT

A data transfer device includes: a plurality of masters each having a buffer and configured to calculate a remaining-time counter based on an amount of data in the buffer; a memory system configured to perform data transfer with the plurality of masters and having a memory access prohibition period during which access from the plurality of masters is intermittently prohibited; a bus arbiter configured to arbitrate the plurality of masters based on the remaining-time counter; and a remaining-time counter-adjusting part configured to add a remaining-time counter offset, which adjusts the remaining-time counter until the start of the memory access prohibition period, to at least one of the plurality of masters.

10 Claims, 6 Drawing Sheets

(56) References Cited

FOREIGN PATENT DOCUMENTS

| JP | 4522808 B2 | 8/2010 |
| JP | 2012-3527 A | 1/2012 |
| JP | 2019-134240 A | 8/2019 |
| WO | 2019/043822 A1 | 3/2019 |

OTHER PUBLICATIONS

Office Action dated Aug. 15, 2023, issued in counterpart JP Application No. 2021-562282, with English translation. (5 pages).

* cited by examiner

FIG. 3

| | BUFFER 12 | REMAINING-TIME COUNTER | PRIORITY |
|---|---|---|---|
| FIRST MASTER 1a | 40 | 40÷4=10 | 2 |
| SECOND MASTER 1b | 24 | 24÷2=12 | 3 |
| THIRD MASTER 1c | 32 | 32÷4=8 | 1 |

DATA TRANSFER DEVICE AND DATA TRANSFER METHOD

CROSS-REFERENCE TO RELATED APPLICATIONS

This application is a continuation application based on PCT Patent Application No. PCT/JP2019/047625, filed on Dec. 5, 2019, the entire content of which is hereby incorporated by reference.

BACKGROUND

Technical Field

The present invention relates to a data transfer device and a data transfer method.

Background Art

In a data transfer device in which a plurality of masters are connected to a memory system via a bus, a bus arbiter is provided to perform arbitration in which the bus usage right is sequentially assigned to the plurality of masters. The bus arbiter mediates the right to use the bus based on the priority of the master. Various arbitration methods have been devised in order to efficiently perform data transfer by a plurality of masters without data loss.

For example, in the bus control device described in Japanese Patent (Granted) Publication No. 4,522,808 (hereinafter referred to as Patent Document 1), the bus usage right is arbitrated based on the remaining-time counter for each master calculated from the amount of data stored in the buffer held by the master and the data transfer rate of the master. Since the bus control device described in Patent Document 1 arbitrates the right to use the bus according to the data transfer status of the buffer held by the master, it is possible to suitably prevent data loss in data transfer.

In order to obtain the highest performance of a memory driven by a low voltage such as LPDDR4, it becomes essential to perform calibration at the initial startup to compensate for characteristic variations due to power supply voltage, temperature, individual workmanship, or the like. Furthermore, it is recommended by the memory manufacturer to perform periodic calibration during operation in order to compensate for a characteristic shift due to environmental changes such as temperature rise even after startup, and if this is not performed, data transfer error may be caused. A master connected to a memory system that uses such a memory is intermittently prohibited from accessing the memory during the period during which the memory system is calibrating. In a data transfer device using a memory system in which a memory access prohibition period occurs intermittently, memory access from all masters is prohibited during the memory access prohibition period.

In the bus arbiter that mediates the bus usage rights of a plurality of masters connected to the memory system where the memory access prohibition period occurs intermittently, it is necessary to arbitrate the bus usage rights so that data loss in data transfer does not occur in all masters. In particular, in a master that performs real-time processing such as display processing, even if a memory access prohibition period occurs intermittently, data loss in data transfer cannot occur.

In a data transfer device that uses a memory system in which a memory access prohibition period occurs intermittently, in order to mediate the bus usage right so that data loss in data transfer does not occur in all masters, it is necessary to manage the remaining buffer capacity of all masters in preparation for the memory access prohibition period, which requires complicated and large-scale arbitration processing.

SUMMARY

Embodiments of the present invention provide a data transfer device and a data transfer method using a memory system in which a memory access prohibition period occurs intermittently, suppressing the occurrence of data loss in data transfer with a simple mechanism.

In one aspect of the present invention, a data transfer device includes: a plurality of masters each having a buffer and configured to calculate a remaining-time counter based on an amount of data in the buffer; a memory system configured to perform data transfer with the plurality of masters and having a memory access prohibition period during which access from the plurality of masters is intermittently prohibited; a bus arbiter configured to arbitrate the plurality of masters based on the remaining-time counter; and a remaining-time counter-adjusting part configured to add a remaining-time counter offset, which adjusts the remaining-time counter until the start of the memory access prohibition period, to at least one of the plurality of masters.

In one aspect of the present invention, a data transfer method in a memory system, which performs data transfer with a plurality of masters and has a memory access prohibition period during which access from the plurality of masters is intermittently prohibited, includes: a remaining-time counter calculation process of calculating a remaining-time counter based on an amount of data in buffers of the plurality of masters; a remaining-time counter offset-adding process of adding a remaining-time counter offset, which adjusts the remaining-time counter until the start of the memory access prohibition period, to at least one of the plurality of masters; and an arbitration process of arbitrating the plurality of masters based on the remaining-time counter.

The data transfer device and data transfer method according to embodiments of the present invention can suppress the occurrence of data loss in data transfer by a simple mechanism in data transfer using a memory system in which a memory access prohibition period occurs intermittently.

BRIEF DESCRIPTION OF THE DRAWINGS

FIG. 3 is a diagram showing an example of mediation by a bus arbiter of the data transfer device.

DETAILED DESCRIPTION OF THE PREFERRED EMBODIMENTS

First Embodiment

A first embodiment of the present invention will be described with reference to FIGS. 1 to 5.

Figure 1:
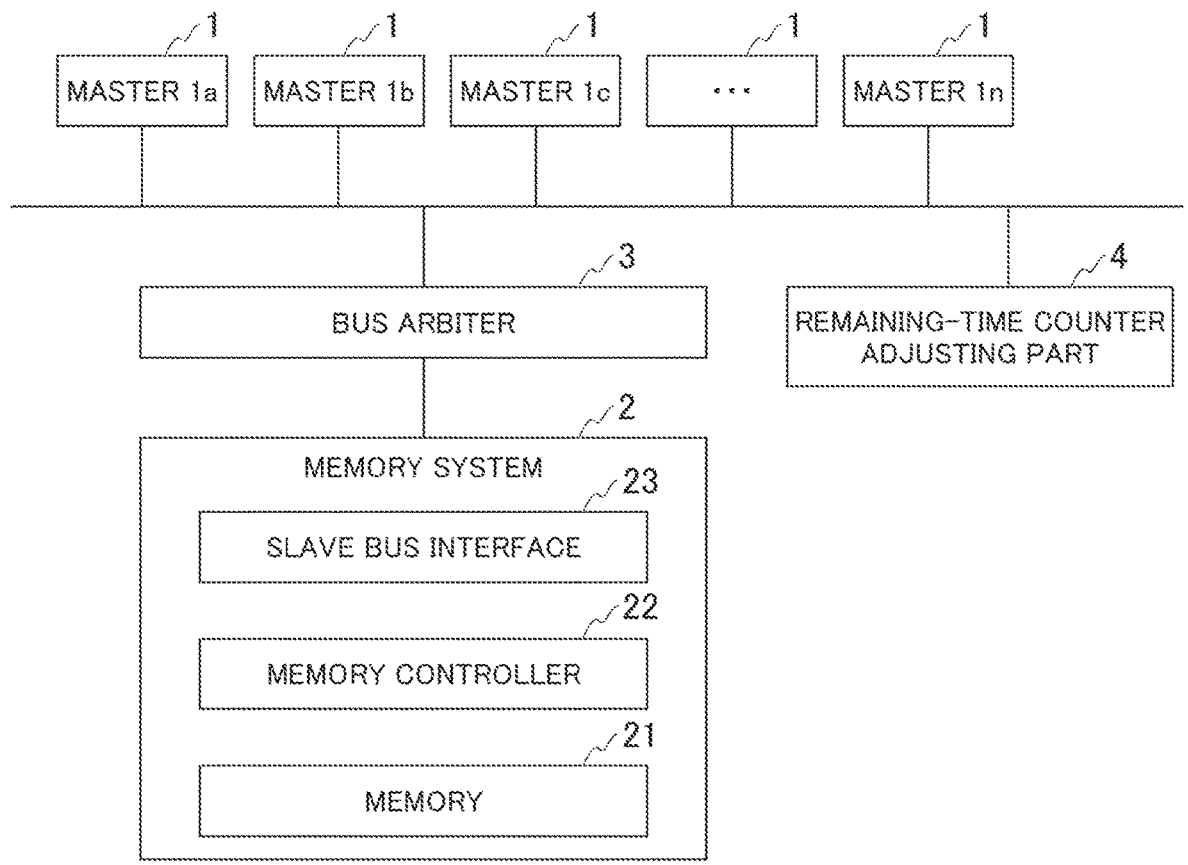
FIG. 1 is a diagram showing an overall configuration of a data transfer device according to a first embodiment of the present invention.

FIG. 1 is a diagram showing the overall configuration of a data transfer device 100 according to the present embodiment.

The data transfer device 100 includes a master 1, a memory system 2, a bus arbiter 3, and a remaining-time counter-adjusting part 4. A plurality of masters 1 are connected to the memory system 2 via a bus. The master 1 is a module that requires real-time processing such as display processing. In the following description, when a plurality of masters 1 are distinguished, each master 1 is described as a first master 1a, a second master 1b, and a third master 1c. In addition, another master that does not require real-time processing may be connected to the memory system 2.

Figure 2:
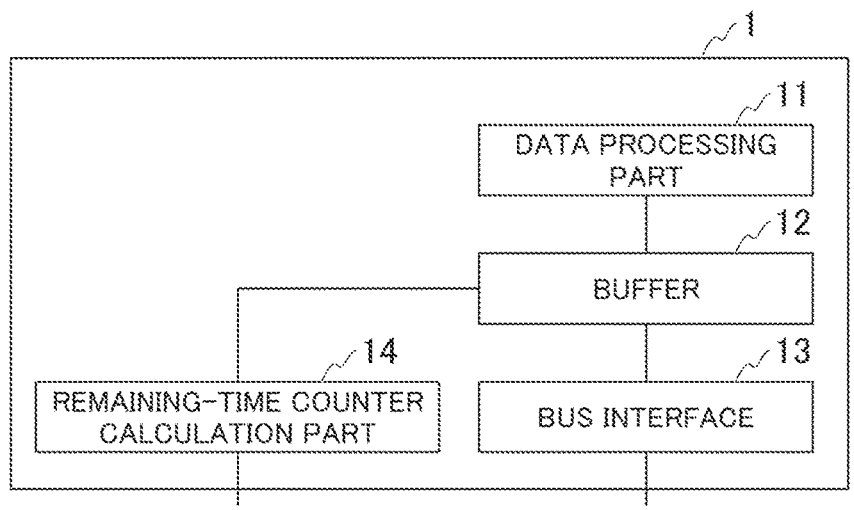
FIG. 2 is a functional block diagram of a master of the data transfer device.

FIG. 2 is a functional block diagram of the master 1.

The master 1 has a data-processing part 11, a buffer 12, a bus interface 13, and a remaining-time counter calculation part 14. When the data transfer direction is from the memory system 2 to the master 1 (in the case of memory read), the data transferred from the memory system 2 via the bus interface 13 is temporarily stored in the buffer 12 and then transferred to the data-processing part 11. When the data transfer direction is from the master 1 to the memory system 2 (in the case of a memory write), the data processed by the data-processing part 11 is temporarily stored in the buffer 12 and then transferred to the memory system 2 via the bus interface 13.

The remaining-time counter calculation part 14 calculates the remaining-time counter based on the amount of data in the buffer 12 and the band required for data transfer (hereinafter referred to as "required band") (remaining-time counter calculation process).

When the data transfer direction is from the memory system 2 to the master 1 (in the case of memory read), the amount of data in the buffer 12 used by the remaining-time counter calculation part 14 to calculate the remaining-time counter is the amount of accumulated data in the buffer 12. On the other hand, when the data transfer direction is from the master 1 to the memory system 2 (in the case of the memory write), the amount of data calculated by the remaining-time counter calculation part 14 is the amount of free data in the buffer 12.

The band required for the remaining-time counter calculation part 14 to calculate the remaining-time counter is the band of data required for the data-processing part 11 to perform data processing without data loss. For example, when the data-processing part 11 constantly requires 32-bit data processing for 4 clocks, the required band is 8 bits/clock (32 bits/4 clocks). The required band may be set and changeable by the CPU or the like by storing it in a register or the like.

The remaining-time counter calculation part 14 calculates a value proportional to the value obtained by dividing the amount of data in the buffer 12 by the required band as the remaining-time counter. That is, (remaining-time counter)∝ (data amount of buffer 12 [bit])/(necessary band [bit/clock]). When the data transfer direction is from the memory system 2 to the master 1 (in the case of memory read), the remaining-time counter indicates a numerical value proportional to the number of clocks until the buffer 12 becomes empty (buffer empty state). On the other hand, when the data transfer direction is from the master 1 to the memory system 2 (in the case of memory write), the remaining-time counter shows a numerical value proportional to the number of clocks until the buffer 12 becomes full (buffer full state). The smaller the calculated remaining-time counter, the smaller the number of cycles to reach the buffer empty state or the buffer full state, so that data loss in data transfer may occur and the urgency is high.

As shown in FIG. 1, the memory system 2 has a memory 21, a memory controller 22, and a slave bus interface 23. The memory system 2 reads data from the memory 21 and writes data in response to a read request and a write request from the master 1 transferred via the slave bus interface 23.

The memory 21 is a memory driven by a low voltage such as LPDDR4, and is a memory that needs to be calibrated periodically not only at the time of initial startup but also during operation to compensate for variations due to temperature and the like.

The memory controller 22 issues commands and transfers data to the memory 21. The memory controller 22 also issues commands necessary for performing the above calibration. The memory controller 22 cannot read data or write data to the memory 21 during the calibration.

The slave bus interface 23 receives a read request and a write request from the master 1. During the period in which the memory controller 22 is performing the calibration, the slave bus interface 23 cannot respond to a read request or a write request beyond the range that the memory controller 22 can accept. That is, the master 1 is prohibited from accessing the memory during the period when the memory system 2 is performing the calibration. The period during which the memory access is prohibited by the master 1 is defined as the "memory access prohibited period". Since calibration needs to be performed regularly even during operation, the memory access prohibition period occurs intermittently.

The bus arbiter 3 is provided between the plurality of masters 1 and the memory system 2, and arbitrates the plurality of masters 1 based on the remaining-time counter (arbitration process). The bus arbiter 3 preferentially grants the right to use the bus to the master having a small remaining-time counter. The master 1 given the right to use the bus by the bus arbiter 3 can access the memory system 2. The bus arbiter 3 may be provided integrally with the memory system 2 or may be provided separately from the memory system 2.

FIG. 3 is a diagram showing an example of mediation by the bus arbiter 3.

In the example shown in FIG. 3, the data transfer directions of the first master 1a, the second master 1b, and the third master 1c are from the memory system 2 to the master 1 (memory read). Further, the required bandwidth of the first master 1a is 4 [bit/clock], the required bandwidth of the second master 1b is 2 [bit/clock], and the required bandwidth of the third master 1c is 4 [bit/clock]. Further, it is assumed that 40 bits of data are stored in the buffer 12 of the first master 1a, 24 bits of data are stored in the buffer 12 of the second master 1b, and 32 bits of data are stored in the buffer 12 of the third master 1c. In this case, the remaining-time counter of the first master 1a is 10, the remaining-time counter of the second master 1b is 12, and the remaining-time counter of the third master 1c is 8. In this case, the priority of the third master 1c having the smallest remaining-time counter is the first, the priority of the first master 1a is the second, and the priority of the second master 1b having the largest remaining-time counter is the third.

Here, when the buffer size of each buffer 12 is different, it is more preferable that the bus arbiter 3 arbitrate the bus priority in consideration of the difference in the buffer size. For example, the bus arbiter 3 mediates the bus priority after weighting the remaining-time counter corresponding to the buffer size of each buffer 12. Specifically, the remaining-time counter used by the bus arbiter 3 for arbitration is multiplied by a weighting coefficient (0<weighting coefficient≤1). Here, the weighting coefficient is a coefficient indicating the ratio of the buffer sizes of each buffer 12, and is expressed as, for example, a ratio to the maximum buffer size. In the example of FIG. 3, since the buffer sizes of all the buffers 12 are equal, the weighting coefficients are all "1".

The remaining-time counter-adjusting part 4 adds an offset (remaining-time counter offset), which adjusts in the master 1 the remaining-time counter presented to the bus arbiter until the start of the memory access prohibition period to be smaller than the value actually calculated by the master 1, to at least one of the plurality of masters 1 (remaining-time counter offset addition process). Here, since the master 1 has a real-time property and constantly executes data processing and the like, there is a high possibility that data loss will occur in data transfer during the memory access prohibition period. In order to avoid this, before the memory access prohibition period starts, the master 1 needs to store in a buffer the amount of accumulated data (required buffer amount) sufficient to continue processing without causing data loss during the memory access prohibition period, or needs to secure an amount of free data (required buffer amount) in the buffer. By reducing the remaining-time counter presented to the bus arbiter by the required buffer amount by the remaining-time counter offset-adding process, the required buffer amount can be continuously secured until the memory access prohibition period starts. Since the length of the memory access prohibition period and the timing of occurrence are known, the required buffer amount can be calculated in advance.

Here, the remaining-time counter to which the remaining-time counter offset is added is referred to as "adjusted remaining-time counter". That is, (adjustment remaining-time counter)=(remaining-time counter calculated by master 1)+(remaining-time counter offset). In the present embodiment, the smaller the value of the remaining-time counter, the higher the urgency. Therefore, the remaining-time counter offset that increases the urgency is a negative value.

The remaining-time counter-adjusting part 4 adds a remaining-time counter offset to a plurality of masters 1. The remaining-time counter-adjusting part 4 may add a remaining-time counter offset of the same value to a plurality of masters 1, or may add a remaining-time counter offset of a different value to each of the plurality of masters 1. The value of the remaining-time counter offset needs to be a value equal to or greater than the required buffer amount. The remaining-time counter-adjusting part 4 does not give the remaining-time counter offset to other masters that do not require real-time processing.

The remaining-time counter calculation part 14 of the master 1 transfers to the bus arbiter 3 the adjustment remaining-time counter calculated by adding the remaining-time counter offset transferred from the remaining-time counter-adjusting part 4 to the remaining-time counter calculated by the remaining-time counter calculation part 14.

The remaining-time counter-adjusting part 4 may be composed of a logic circuit or software that operates in the CPU. Since the remaining-time counter-adjusting part 4 needs to operate during the memory access prohibition period, it is preferable that the remaining-time counter-adjusting part 4 be composed of a logic circuit.

The remaining-time counter-adjusting part 4 reduces an offset amount (absolute value) of the remaining-time counter offset during the memory access prohibition period. In the present embodiment, the remaining-time counter-adjusting part 4 sets the value of the remaining-time counter offset to zero during the memory access prohibition period.

Figure 4:
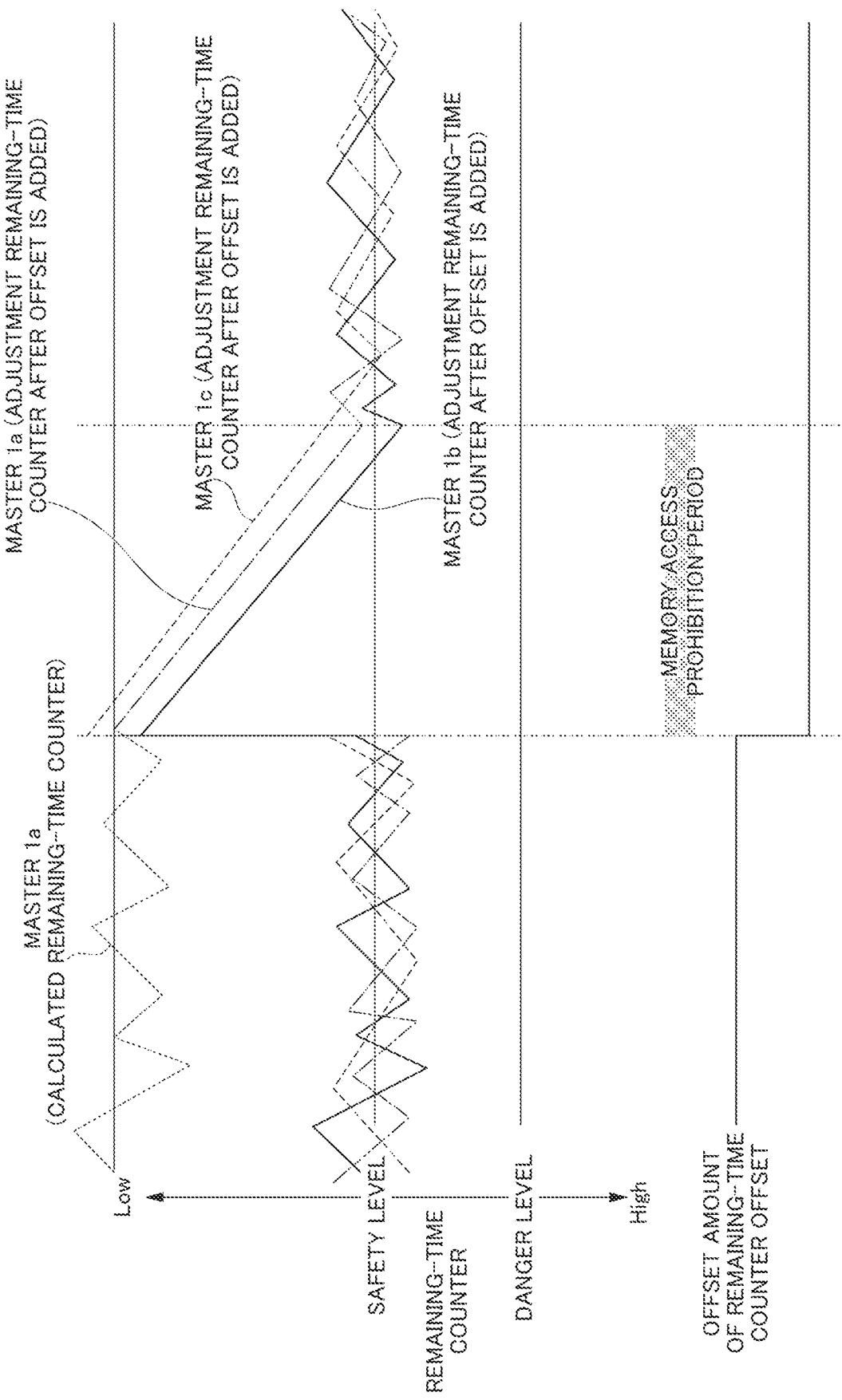
FIG. 4 shows transition of an adjustment remaining-time counter of the master before and after a memory access prohibition period of the data transfer device.

Next, the operation of the data transfer device 100 will be described. FIG. 4 shows the transition of the adjustment remaining-time counter of the master 1 (first master 1a, second master 1b, third master 1c) before and after the memory access prohibition period.

As shown in FIG. 4, the master 1 (first master 1a, second master 1b, third master 1c) has a remaining-time counter offset added until the start of the memory access prohibition period, and the adjustment remaining-time counter is smaller than the actually calculated remaining-time counter. The bus arbiter 3 arbitrates so that the remaining-time counters of all masters 1 are close to the safety level. Therefore, the master 1 to which the remaining-time counter offset is added is arbitrated in the normal priority order while securing the required buffer amount in the arbitration of the bus usage right by the bus arbiter 3.

When the data transfer direction is from the memory system 2 to the master 1 (in the case of memory read), the amount of accumulated data in the buffer 12 of the master 1 becomes larger. On the other hand, when the data transfer direction is from the master 1 to the memory system 2 (in the case of memory write), the amount of free data in the buffer 12 of the master 1 becomes larger.

The remaining-time counter-adjusting part 4 adjusts the value of the remaining-time counter offset to be added so that the required buffer amount is secured by the start of the memory access prohibition period during the memory access prohibition period.

When the data transfer direction is from the memory system 2 to the master 1 (in the case of memory read), the value of the remaining-time counter offset before the start of the memory access prohibition period is adjusted so that a sufficient amount of data is read from the memory system 2 and stored in the buffer 12 so that the buffer 12 does not become empty (buffer empty state) during the memory access prohibition period.

On the other hand, when the data transfer direction is from the master 1 to the memory system 2 (in the case of memory write), the value of the remaining-time counter offset before the start of the memory access prohibition period is adjusted so that a sufficient amount of data by which the buffer 12 does not become full (buffer full state) during the memory access prohibition period is fetched from the buffer 12 and written to the memory system 2.

The master 1 is prohibited from memory access during the memory access prohibition period. Therefore, as shown in FIG. 4, the remaining-time counter of the master 1 becomes smaller with the passage of time during the memory access prohibition period. However, at the end of the memory access prohibition period, none of the remaining-time counters of the masters 1 have reached the danger level, and no data loss has occurred in the data transfer.

The remaining-time counter-adjusting part 4 sets the value of the remaining-time counter offset to zero at the start of the memory access prohibition period. As shown in FIG. 4, the adjustment remaining-time counters of the master 1 are at the same level before and after the start and end of the memory access prohibition period, and have not reached the danger level. Therefore, at the end of the memory access prohibition period, the bus arbiter 3 does not perform arbitration such as concentrating the bus usage right to some masters 1, and can continue arbitration in the same normal priority as before the start of the memory access prohibition period.

Figure 5:
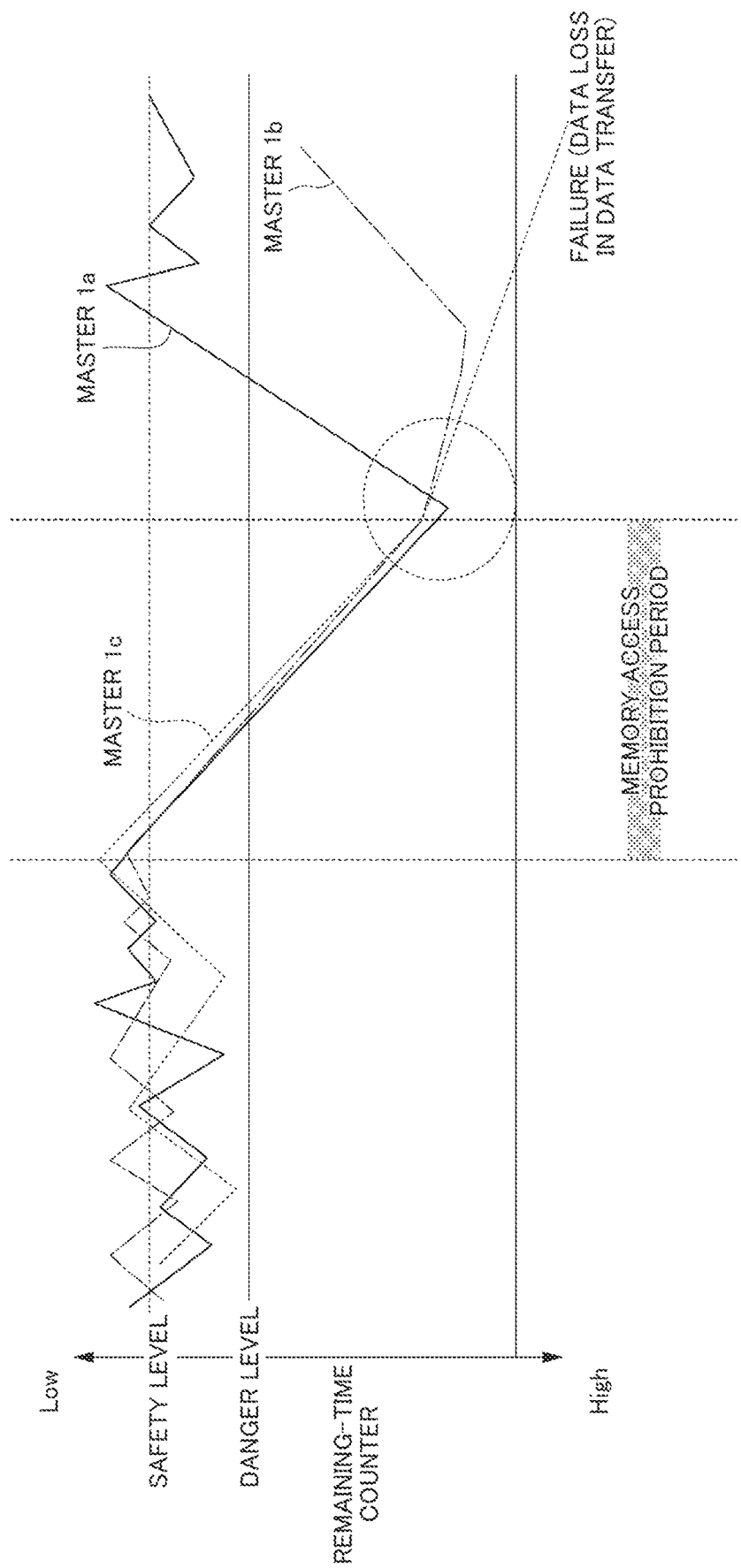
FIG. 5 shows transition of a remaining-time counter of the master in the data transfer device of a comparative example.

FIG. 5 shows the transition of the remaining-time counter of the master 1 (first master A, second master B, third master C) in the data transfer device having no remaining-time counter-adjusting part 4, as a comparative example. Since the remaining-time counter offset is not added until the start of the memory access prohibition period, and the danger level is set to a large level that secures the required buffer amount that can withstand the memory access prohibition period, the remaining-time counter of the master 1 is such that a plurality of masters greatly exceed the danger level at the end of the memory access prohibition period, and highly urgent arbitration occurs between the plurality of masters. As a result, unlike arbitration in the normal priority order, suitable scheduling cannot be performed, and the master 1 may experience data loss in data transfer during the memory access prohibition period.

In the data transfer device of the comparative example, as shown in FIG. 5, at the end of the memory access prohibition period, all the remaining-time counters of the first master A, the second master B, and the third master C reach the danger level. As shown in FIG. 5, when the bus arbiter 3 continuously arbitrates to grant the right to use the bus to the first master A, which has a higher priority among the masters 1 whose remaining-time counter has reached the danger level, the remaining-time counter of the first master A returns to the safe level. Here, the third master C, which has a low priority, cannot be granted the right to use the bus, resulting in data loss in data transfer.

According to the data transfer device 100 of the present embodiment, in the data transfer device 100 using the memory system 2 in which the memory access prohibition period occurs intermittently, it is possible to suppress the occurrence of data loss in the data transfer by a simple mechanism. Even if the memory access prohibition period occurs intermittently by simply adding the remaining-time counter-adjusting part 4 to a general data transfer device that mediates the bus usage right using a remaining-time counter or the like, it is possible to suppress the occurrence of data loss in data transfer. At the side of the bus arbiter 3 that mediates the bus usage right using the remaining-time counter, it is not necessary to make a major specification change in order to cope with the occurrence of the memory access prohibition period.

Although the first embodiment of the present invention has been described in detail with reference to the drawings, the specific configuration is not limited to this embodiment and includes design changes and the like within a range not deviating from the gist of the present invention. In addition, the components shown in the above-described embodiments and modifications can be appropriately combined and configured.

Modification 1

For example, in the above embodiment, the remaining-time counter-adjusting part 4 adds a remaining-time counter offset to each master 1 and adds a remaining-time counter offset to the remaining-time counter calculated by the master 1, but the calculation mode of the adjustment remaining-time counter is not limited to this. The addition of the remaining-time counter offset may be performed by the bus arbiter 3 instead of the master 1.

Modification 2

For example, in the above embodiment, the remaining-time counter calculation part 14 of the master 1 calculates the remaining-time counter based on the amount of data in the buffer 12 and the required band, but the calculation mode of the remaining-time counter is not limited to this. The remaining-time counter calculation part 14 may calculate the remaining-time counter only from the amount of data in the buffer. Although the accuracy of predicting urgency is reduced, the remaining-time counter can be calculated more easily.

Second Embodiment

A data transfer device 100B according to the second embodiment of the present invention will be described with reference to FIGS. 6 to 7. In the following description, the same reference numerals will be given to the configurations common to those already described, and duplicate description will be omitted. The data transfer device 100B differs from the data transfer device 100 of the first embodiment in the method of adjusting the remaining-time counter.

The data transfer device 100B includes a master 1, a memory system 2, a bus arbiter 3, and a remaining-time counter-adjusting part 4B.

The remaining-time counter-adjusting part 4B adds a remaining-time counter offset to a plurality of masters 1. The remaining-time counter-adjusting part 4 gradually increases the offset amount (absolute value) of the remaining-time counter offset from the end of the memory access prohibition period to the start of the memory access prohibition period.

Figure 6:
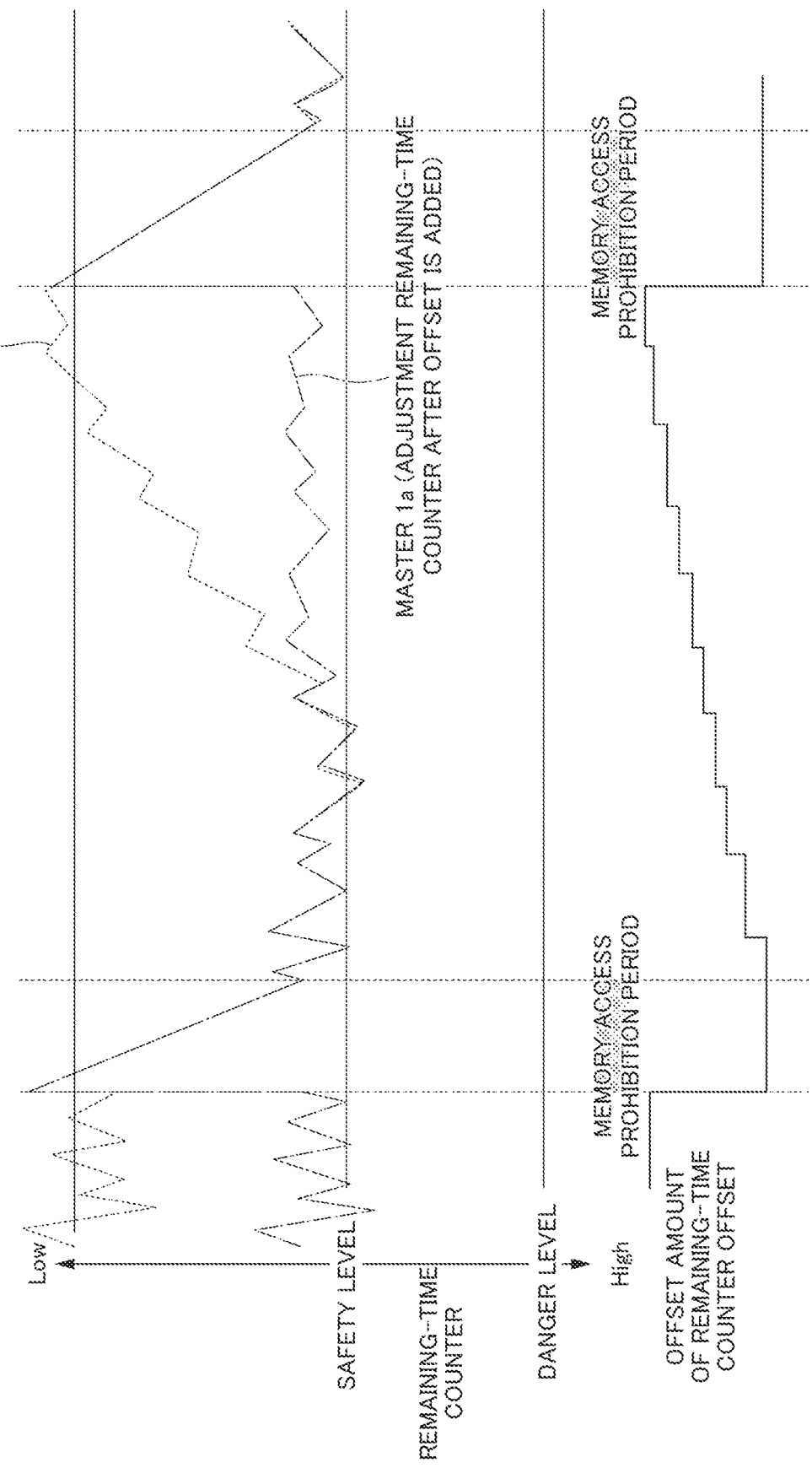
FIG. 6 shows transition of an adjustment remaining-time counter of a master before and after a memory access prohibition period of a data transfer device according to a second embodiment of the present invention.

FIG. 6 shows the transition of the adjustment remaining-time counter of the master 1 before and after the memory access prohibition period in the data transfer device 100B.

As shown in FIG. 6, the master 1 is provided with a remaining-time counter offset that changes stepwise from the end of the memory access prohibition period to the start of the memory access prohibition period. Since the adjustment remaining-time counter transferred from the master 1 to the bus arbiter 3 gradually increases without increasing rapidly, the bus arbiter 3 does not extremely lower the priority of the bus usage right to the master 1 whose adjustment remaining-time counter has suddenly increased. By performing the same processing on the other master 1, efficient arbitration can be performed without performing arbitration such that the bus usage right is exclusively granted only to one master 1.

According to the data transfer device 100B of the present embodiment, in the data transfer device 100 using a memory system in which a memory access prohibition period occurs intermittently, it is possible to suppress the occurrence of data loss in data transfer by a simple mechanism. By adding the remaining-time counter offset that changes stepwise, the arbitration of the bus arbiter 3 at the time of giving the remaining-time counter offset can be smoothly performed.

Although the second embodiment of the present invention has been described in detail with reference to the drawings, the specific configuration is not limited to this embodiment and includes design changes and the like within a range not deviating from the gist of the present invention. In addition, the components shown in the above-described embodiments and modifications can be appropriately combined and configured.

Modification 3

Figure 7:
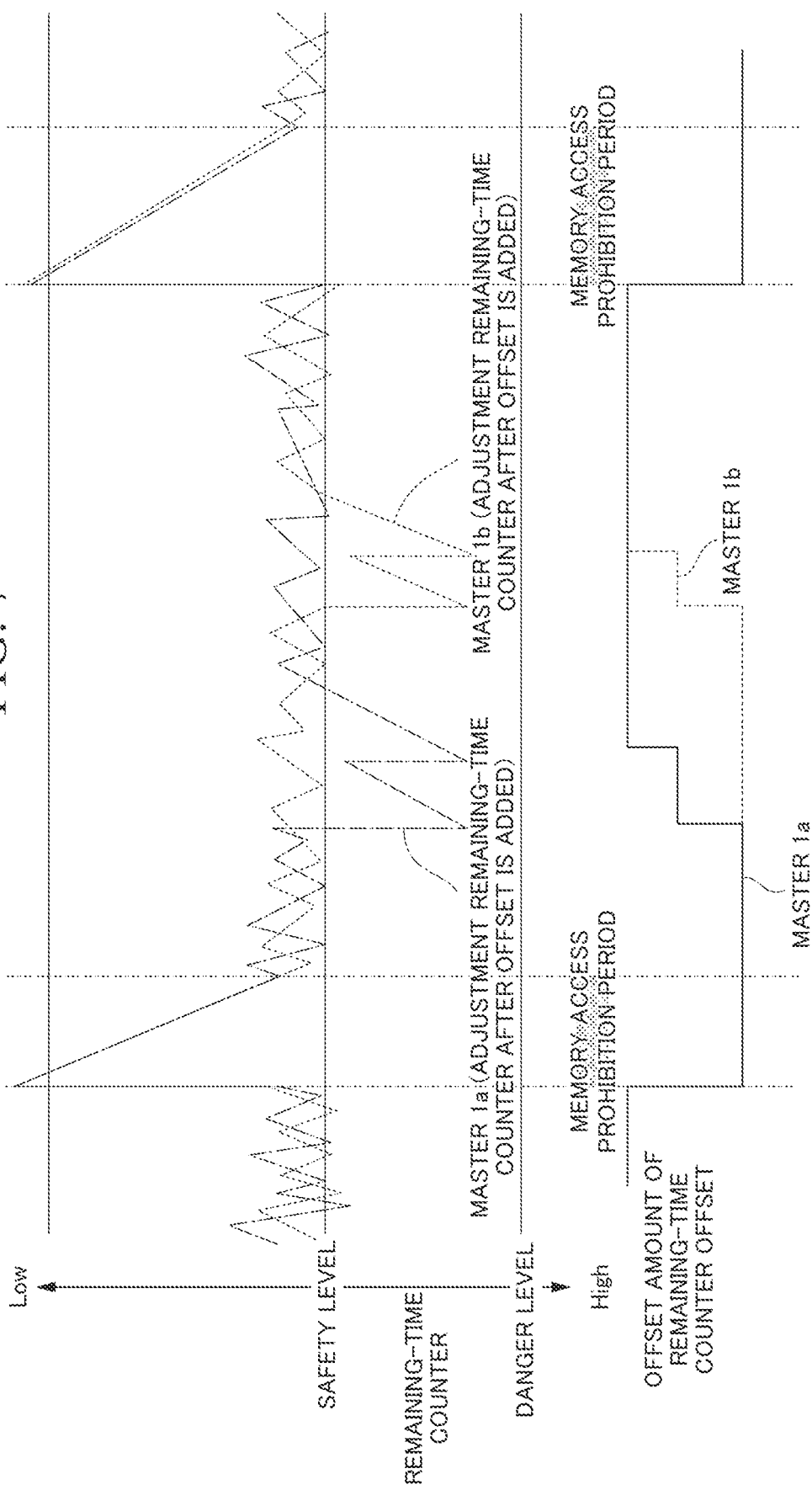
FIG. 7 shows transition of an adjustment remaining-time counter of a master according to a modification of a remaining-time counter-adjusting part of the data transfer device.

FIG. 7 shows the transition of the adjustment remaining-time counter of the master 1 by the remaining-time counter-adjusting part 4C, which is a modification of the remaining-time counter-adjusting part 4B.

The remaining-time counter-adjusting part 4C changes the remaining-time counter offset by providing a time difference for each master 1 from the end of the memory access prohibition period to the start of the memory access prohibition period. As shown in FIG. 7, after the memory access prohibition period ends, the remaining-time counter-adjusting part 4C first gradually increases the offset amount (absolute value) of the remaining-time counter offset of the first master 1a. After that, the remaining-time counter-adjusting part 4C gradually increases the offset amount (absolute value) of the remaining-time counter offset of the second master 1b.

Compared with the case where the remaining-time counter offsets of a plurality of masters 1 are changed at the same time, the bus arbiter 3 is less likely to have a conflict requesting the right to use the bus, and the bus can be used more efficiently.

The present invention can be applied to a data transfer device in which a plurality of masters are connected to a memory system.

What is claimed is:

1. A data transfer device, comprising:
   a plurality of masters each having a buffer and configured to calculate a remaining-time counter based on an amount of data in the buffer;
   a memory system configured to perform data transfer with the plurality of masters and having a memory access prohibition period during which access from the plurality of masters is intermittently prohibited;
   a bus arbiter configured to arbitrate the plurality of masters based on the remaining-time counter; and
   a remaining-time counter-adjusting part configured to add a remaining-time counter offset, which adjusts the remaining-time counter until the start of the memory access prohibition period, to at least one of the plurality of masters.

2. The data transfer device according to claim 1, wherein the plurality of masters calculate the remaining-time counter using a band required for the data transfer in addition to the amount of data in the buffer, and the remaining-time counter becomes smaller as time until the amount of data stored in the buffer becomes empty or full becomes shorter.

3. The data transfer device according to claim 1, wherein the remaining-time counter-adjusting part gradually increases an offset amount of the remaining-time counter offset from the end of the memory access prohibition period to the start of the memory access prohibition period.

4. The data transfer device according to claim 3, wherein the remaining-time counter-adjusting part adds the remaining-time counter offset that adds the remaining-time counter having a different value to each of the plurality of masters.

5. The data transfer device according to claim 1, wherein the remaining-time counter-adjusting part changes the remaining-time counter offset by providing a time difference for each of the plurality of masters.

6. A data transfer method in a memory system that performs data transfer with a plurality of masters and has a memory access prohibition period during which access from the plurality of masters is intermittently prohibited, the method comprising:
   a remaining-time counter calculation process of calculating a remaining-time counter based on an amount of data in buffers of the plurality of masters;
   a remaining-time counter offset-adding process of adding a remaining-time counter offset, which adjusts the remaining-time counter until the start of the memory access prohibition period, to at least one of the plurality of masters; and
   an arbitration process of arbitrating the plurality of masters based on the remaining-time counter.

7. The data transfer method according to claim 6, wherein the remaining-time counter calculation process includes calculating the remaining-time counter using a band required for the data transfer in addition to the amount of data in the buffer, and the remaining-time counter becomes smaller as time until the amount of data stored in the buffer becomes empty or full becomes shorter.

8. The data transfer method according to claim 6, wherein, in the remaining-time counter offset-adding process, an offset amount of the remaining-time counter offset is gradually increased from the end of the memory access prohibition period to the start of the memory access prohibition period.

9. The data transfer method according to claim 8, wherein the remaining-time counter offset-adding process includes adding the remaining-time counter offset that adds the remaining-time counter having a different value to each of the plurality of masters.

10. The data transfer method according to claim 6, wherein, in the remaining-time counter offset-adding process, the remaining-time counter offset is changed by providing a time difference for each of the plurality of masters.

* * * * *